(12) United States Patent
Pan

(10) Patent No.: US 9,313,845 B2
(45) Date of Patent: Apr. 12, 2016

(54) LED LAMP STRING

(71) Applicant: Kuo-Wei Pan, Hsinchu (TW)

(72) Inventor: Kuo-Wei Pan, Hsinchu (TW)

( * ) Notice: Subject to any disclaimer, the term of this patent is extended or adjusted under 35 U.S.C. 154(b) by 51 days.

(21) Appl. No.: 14/042,701

(22) Filed: Sep. 30, 2013

(65) Prior Publication Data

US 2015/0091453 A1    Apr. 2, 2015

(51) Int. Cl.
*H05B 37/00* (2006.01)
*H05B 33/08* (2006.01)

(52) U.S. Cl.
CPC .................... *H05B 33/0821* (2013.01)

(58) Field of Classification Search
CPC ........ H05B 37/00; H05B 37/02; H05B 33/08; H05B 33/0821; F21V 23/001
USPC ........ 315/51, 209 R, 224, 291, 307; 362/219, 362/470, 800
See application file for complete search history.

(56) References Cited

U.S. PATENT DOCUMENTS

| | | | |
|---|---|---|---|
| 6,201,353 B1 * | 3/2001 | Chang et al. ............... | 315/185 S |
| 7,138,770 B2 * | 11/2006 | Uang .................. | H05B 33/0821 |
| | | | 315/185 R |
| 2011/0169408 A1 * | 7/2011 | Chen et al. ...................... | 315/51 |

* cited by examiner

*Primary Examiner* — Jimmy Vu
(74) *Attorney, Agent, or Firm* — Leong C. Lei

(57) ABSTRACT

A novel LED lamp string is provided whose LED lamps are protected from current/voltage fluctuation. The gist of the present invention lies in the configuration of a number of resistors series-connected to the LED lamps along the cable of the LED lamp string. With the resistors, the current and voltage along the cable are stable with no sudden high or low, and therefore the LED lamps have longer operational lives.

1 Claim, 4 Drawing Sheets

LED LAMP STRING

TECHNICAL FIELD OF THE INVENTION

The present invention is generally related to a string of lamps, and more particular to a string of LED lamps series-connected with resistors.

DESCRIPTION OF THE PRIOR ART

Due to the growing concern over global warming, energy conservation has become a mainstream issue. For lighting devices, there are various new developments to replace the conventional incandescent lamps. The most promising candidate is light emitting diodes (LEDs). The Christmas lamp strings nowadays mainly employ LED lamps.

As shown in FIG. 1, a conventional LED lamp string 10 contains a cable 30 with a plug 20 for plugging into a wall socket. A number of LED lamps 40 are series-connected along and by the cable 30. The cable 30 contains a number of branch cables 31 connected in parallel to the plug 20, and each branch cable 31 has a number of LED lamps 40 series-connected along and by the branch cable 31. As such, the LED lamp string 10 can be hung with the branch cables 31 as pendants like a curtain. The drawback to this conventional LED lamp string 10 is that it lacks a mechanism for stabilizing current and voltage. Therefore, the LED lamp string may suffer sudden high or low current/voltage. For incandescent lamps, they can withstand this current/voltage instability. However, for LED lamps, they are more sensitive to and could be damaged by this current/voltage fluctuation.

SUMMARY OF THE INVENTION

As such, a novel LED lamp string is provided to extend the operational lives of the LED lamps on a LED lamp string.

The gist of the present invention lies in the configuration of a number of resistors series-connected to the LED lamps along the cable of the LED lamp string. With the resistors, the current and voltage along the cable are stable with no sudden high or low, and therefore the LED lamps have longer operational lives.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become apparent to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
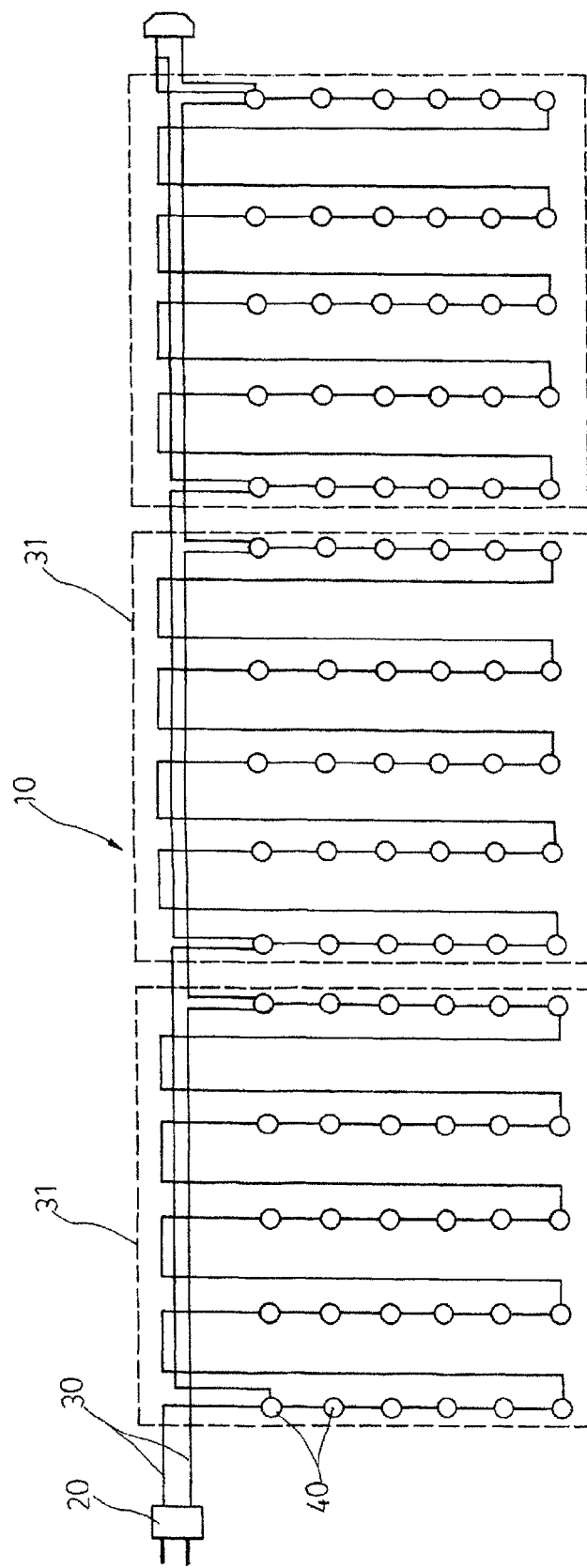
FIG. 1 is a schematic diagram showing a conventional LED lamp string where the LED lamps are arranged along a number of branch cables as pendants.
Figure 2:
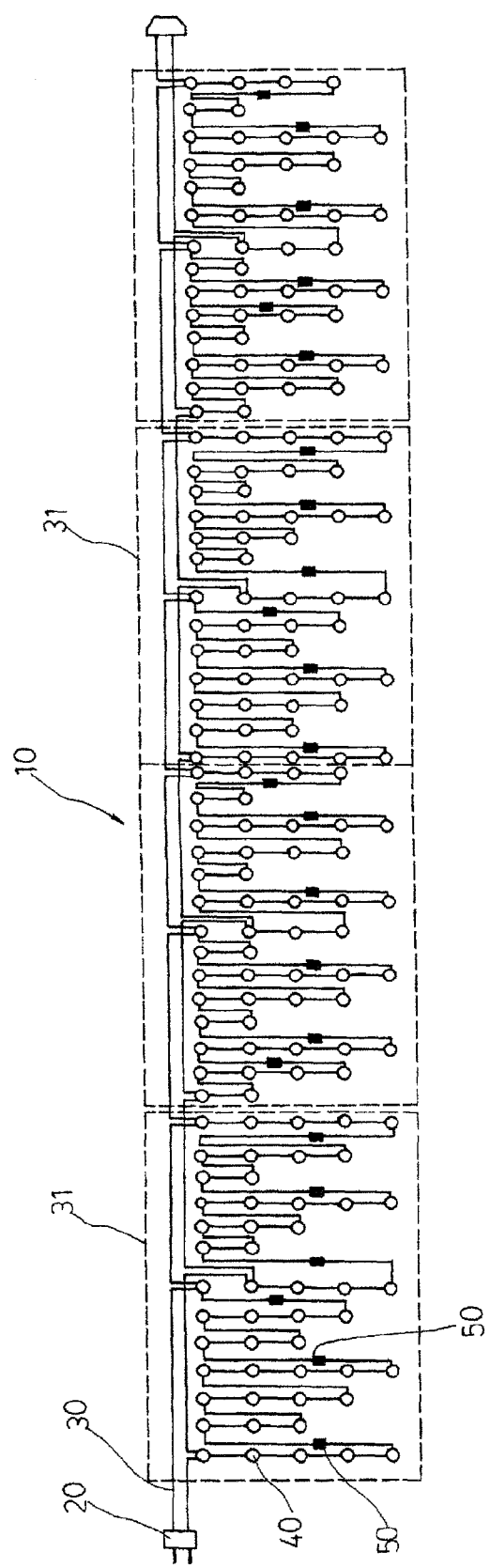
FIG. 2 is a schematic diagram showing a LED lamp string according to a first embodiment where the LED lamps are arranged along a number of branch cables as pendants.

As illustrated in FIG. 2, a LED lamp string 10 according to a first embodiment of the present invention contains a plug 20, a cable 30 connected to the plug 20, and a number of LED lamps 40 connected to the cable 30. In the present embodiment, the cable 30 contains a number of branch cables 31 connected in parallel to the plug 20 and, on each branch cable 31, a number of LED lamps 40 are connected in series along and by the branch cable 31. As such, the LED lamp string 10 can be hung with the branch cables 31 and the LED lamps 40 as pendants distributed over a planar area like a curtain. Additionally, on each branch cable 31, a number of resistors 50 are connected in series to the LED lamps 40 along and by the branch cable 31, so that the current and voltage along the entire cable 30 are stable with no sudden high or low, and so that the LED lamps 40 have longer operational lives. Preferably, there are 5 or 6 resistors 50 along each branch cable 31.

Figure 3:
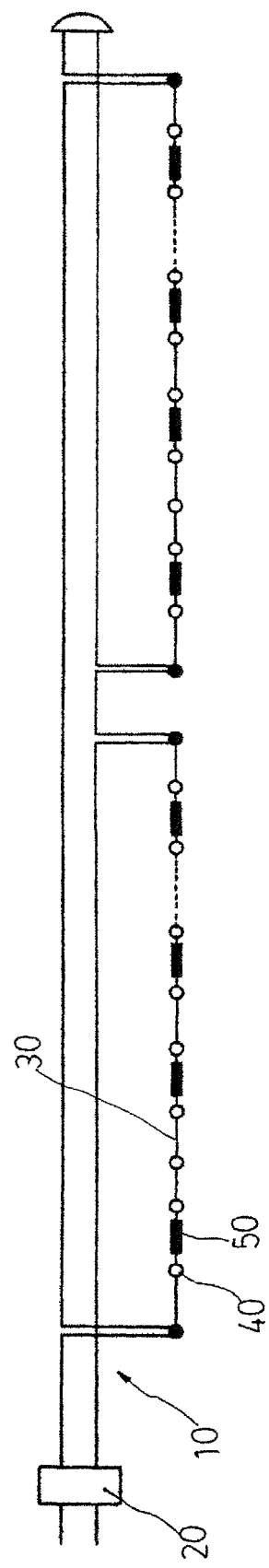
FIG. 3 is a schematic diagram showing a LED lamp string according to a second embodiment of the present invention where the LED lamps are arranged in a linear manner.
Figure 4:
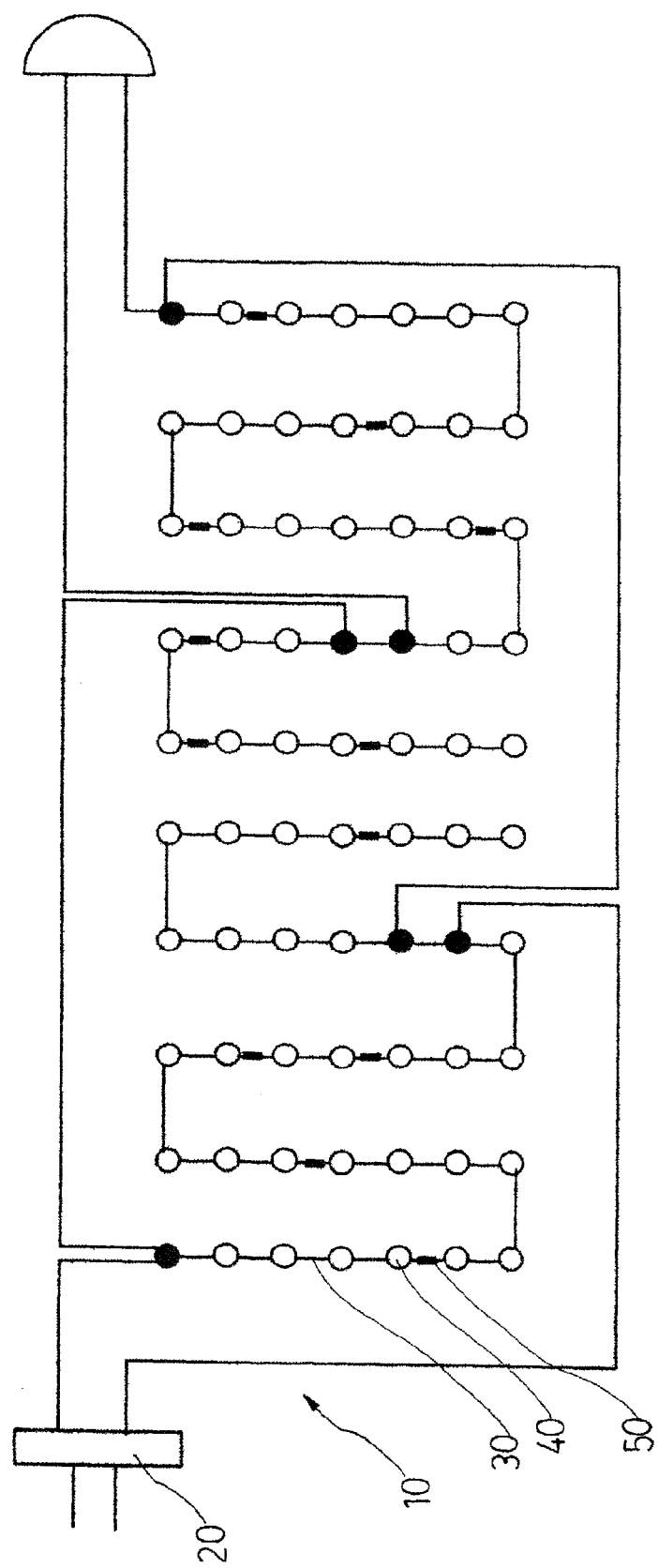
FIG. 4 is a schematic diagram showing a LED lamp string according to a third embodiment of the present invention where the LED lamps are arranged in a mesh.

FIG. 3 shows a LED lamp string 10 according to a second embodiment of the present invention where the LED lamps 40 are arranged in a linear manner. FIG. 4 shows another LED lamp string 10 according to a third embodiment of the present invention where the LED lamps 40 are arranged in a mesh. Again, a number of resistors 50 are configured in series along and by the cable 30, so that the current and voltage along the entire cable 30 are stable and the LED lamps 40 have longer operational lives.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:
1. A LED lamp string comprising:
    a plug; and
    a cable connected to the plug, the cable comprising a plurality of branch cables connected in parallel to the plug, each branch cable comprising a plurality of LED lamps and a plurality of resistors connected in series;
    wherein there are at least two resistors along each branch cable, separating the LED lamps along each branch cable into at least three groups; the groups of LED lamps along each branch cable are of different numbers of LED lamps; and the LED lamp string is hung with the branch cables and the LED lamps as pendants distributed over a planar area.

* * * * *